United States Patent [19]
Wood

[11] 3,929,606
[45] Dec. 30, 1975

[54] PROTECTION SYSTEM FOR THE METALLIC FITTINGS OF NON-METALLIC HULLS OF POWER BOATS

[75] Inventor: Ralph E. Wood, Lake Worth, Fla.

[73] Assignee: Dunwood Development Corporation, Lake Worth, Fla.

[22] Filed: Jan. 18, 1973

[21] Appl. No.: 324,665

[52] U.S. Cl.............. 204/196; 204/147; 114/.5 R; 114/221 R
[51] Int. Cl.²................. C23F 13/00; B63B 17/00
[58] Field of Search ......... 204/147, 196, 148, 197; 114/.5 R, 221 R, 222

[56] References Cited
UNITED STATES PATENTS

| | | | |
|---|---|---|---|
| 2,762,767 | 9/1956 | Mosher et al. | 204/147 |
| 2,878,173 | 3/1959 | Obermann | 204/196 |
| 2,890,157 | 6/1959 | Raetzsch | 204/196 |
| 3,223,604 | 12/1965 | Marsh et al. | 204/196 |
| 3,241,512 | 3/1966 | Green | 114/222 |
| 3,303,118 | 2/1967 | Anderson | 204/196 |

OTHER PUBLICATIONS
"Motor Boating & Sailing," Feb. 1972, pp. 77–92.

*Primary Examiner*—T. Tung
*Attorney, Agent, or Firm*—John H. Merchant

[57] ABSTRACT

A system for cathodically protecting the metallic fittings of non-metallic hulls of power boats when such boats are docked and electrical power is supplied from a shore-based 110 volt alternating current supply, a novel circuitry in which a battery charger is used to maintain all banks of storage batteries in operating condition, a flexible switching arrangement permitting the testing and charging of each bank of batteries, together or separately, and in which the negative leads of the battery charger, the banks of batteries, the equipment ground and the neutral leg of the shore-based alternating current supply are electrically connected with both the ground plate and the ship's bonding ground of the boat to lessen or eliminate electrolysis.

4 Claims, 1 Drawing Figure

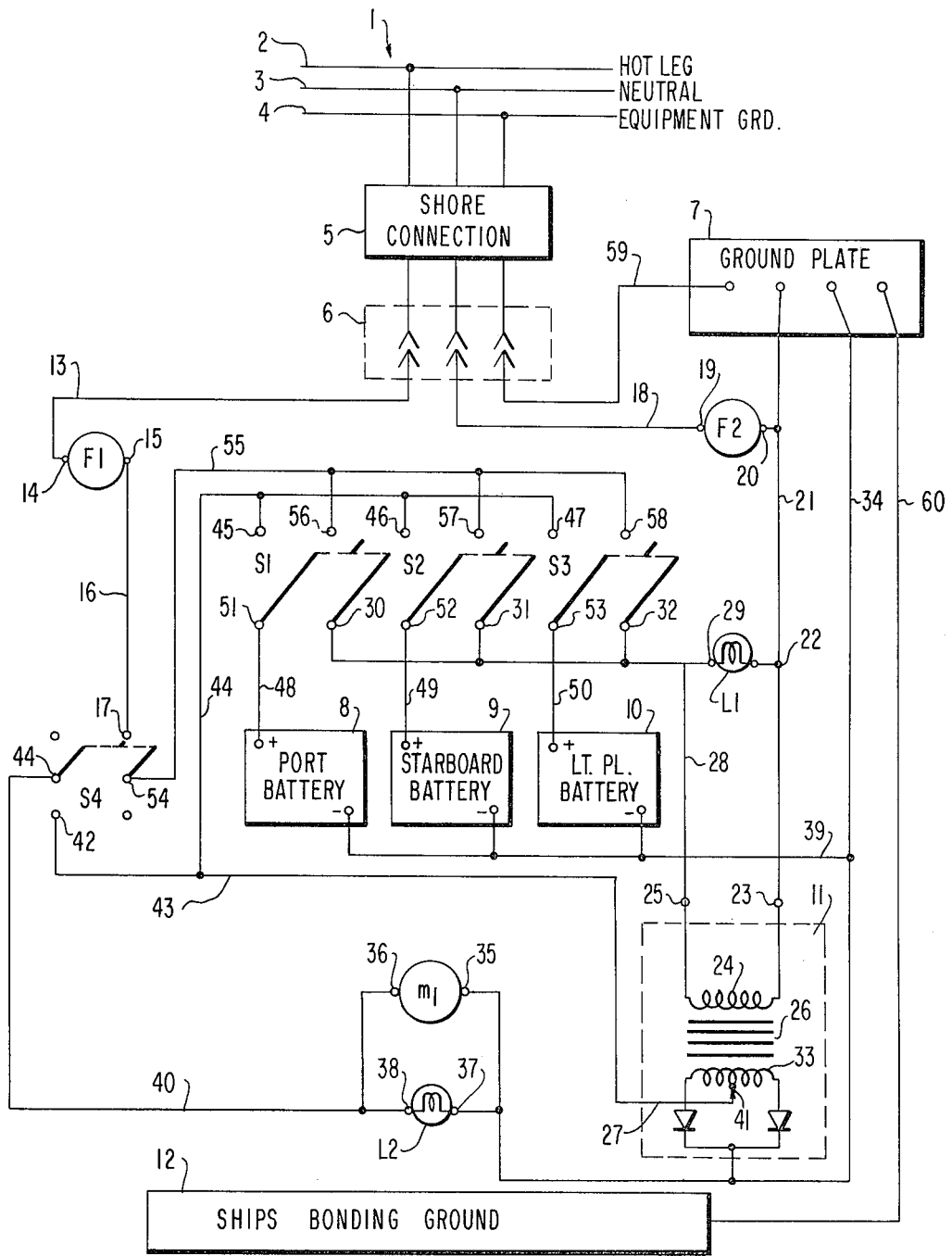

PROTECTION SYSTEM FOR THE METALLIC FITTINGS OF NON-METALLIC HULLS OF POWER BOATS

This invention relates to a system for cathodically protecting the metallic fittings of non-metallic hulls, such as those constructed of wood or fiber glass, of power boats including cabin cruisers, usually of less than 100 feet in length, and more particularly, to a novel circuitry in which a battery charger is employed to maintain all banks of storage batteries in peak operating condition, and in which the electrolysis problem is lessened or eliminated.

Normally, when boats of the type in question are docked, electrical power is obtained from a shore-based power source rather than from on-board electrical generation equipment. The electrical circuits customarily employed are usually responsible for excessive corrosion of the metal fittings of the boat normally immersed in water because of the galvanic condition existing between the boat and shore-located metal installations.

One of the purposes of this invention is to lessen or eliminate this objectionable electrolysis problem and at the same time to provide a flexible switching system to permit testing of the individual banks of storage batteries and to maintain the batteries in peak operating condition at all times.

The circuit herein described is designed to keep the various banks of ships batteries, namely, port, starboard, and light plant, in fully charged condition without the necessity of crawling into the bilge to hook up a portable battery charger. Thus, the possibility of damaging the engine alternators or light plant, which happens all too often from an arc or wrong polarity hook-up while connecting the portable battery charger, is avoided.

A switching system is provided whereby the condition of each bank of storage batteries may be checked as well as the efficiency of the alternators. In the event any one of the banks of storage batteries is found to be low, the charger may be switched on for that particular bank for a few hours to bring the batteries up to a normal charge. If desired, the charger may be left on overnight without danger of overcharging since, as the batteries come up to a peak charge, the charging rate automatically tapers off.

My system is so designed that the usual boat equipment may be continuously operated while the boat is in port so that the difficulties and inconvenience resulting from discharged batteries are avoided. The battery charger, connected as herein described, may be used, for example, to operate an eight-track tape stereo or ship-to-shore radio. Even though the ship is plugged into shore power, as a general rule, batteries are still used to pump fresh water and to operate toilets, the sump pump of the shower, tape stereo, radio, and the many other electrically powered devices found on modern ships. In the event it is found that the batteries are not fully charged, simply switch on the charger until the batteries are back to peak, and for the average ship an over-night charge twice a week will usually suffice. However, with my system you may use as much current as is normally necessary since the charger may be used continuously, if desired.

In this system, all battery grounds and the 110 volt alternating current shore-based equipment ground are connected and it has been found that this minimizes the electrolysis problem encountered in non-metallic hull vessels, and in many instances eliminates the necessity of using sacrificial zincs.

These, and other advantages of my novel circuitry will be apparent from the following description.

In the accompanying drawing there is shown a diagram of a preferred form of circuitry for a power boat having a non-metallic hull and supplied from a shore-based source of 110 volt alternating current power and including a marine battery charger with associated selenium rectifier for maintaining the storage batteries in operating condition.

The major components of my improved circuit comprise a 110 volt alternating current shore-based source of power 1; a conventional shore connection 5; a reverse service boat receptacle 6; ten ampere fuses F-1 and F-2; a ground plate 7; a set of three double-pole-single-throw switches, S-1; S-2, and S-3; a double-pole-double-throw switch S-4; a 110 volt neon light L-1; three banks of storage batteries, 8; 9, and 10; a marine battery charger and associated selenium rectifier; a short scale meter M-1; a meter light L-2, and a ship's bonding ground 12.

In the accompanying drawing the numeral 1 designates, in general, a shore-based 3-wire 110 volt source of alternating current comprising a hot leg 2 (coded black); a neutral leg 3 (coded white), and an equipment ground 4 (coded green).

The numeral 5 identifies a conventional shore connection linked by the customary cable to the ship's electrical circuit through a reverse service boat receptacle 6. This portion of the circuit represents conventional practice as shown in the February 1972 issue of MOTOR BOAT AND SAILING, FIG. 1, at page 82.

The hot leg 2, of the shore-based power supply is connected through shore connection 5 and the reverse boat receptacle 6 by line 13 to terminal 14 of a ten ampere fuse F-1, the other terminal 15 of the fuse being connected by line 16 to terminal 17 of the double-pole-double-throw switch S-4.

The neutral leg 3 of the shore-based power supply is connected through shore connection 5 and the reverse service boat receptacle 6 by line 18 to terminal 19 of a ten ampere fuse F-2. A line 21 connects terminal 20 of fuse F-2 with the ground plate 7; terminal 22 of the neon light L-1 and terminal 23 of the primary 24 of the stepdown transformer 26 of the battery charger 11 and the associated selenium rectifier 27.

The other terminal 25 of the primary of the transformer 11 is connected by line 28 to terminal 29 of neon light L-1, and to terminals 30; 31, and 32 of double-pole-single-throw switches S-1; S-2, and S-3, respectively.

The output from the secondary 33 of the step-down transformer 26 is converted into direct current by the full-wave rectifier 27, the resulting negative direct current output being connected by line 34 to the ground plate 7; to terminal 35 of the short scale meter M-1, to terminal 37 of the meter light L-2, and through line 39, to the negative terminals of the three banks of storage batteries, namely, the port battery 8; the starboard battery 9, and the light plant battery 10. Line 40 connects terminal 36 of the short scale meter M-1 and terminal 38 of meter light L-2 with terminal 44 of the double-pole-double-throw switch S-4.

A center tap 41 from the secondary 33 of the step-down transformer 26, the positive pole of the rectifier 27, is connected by line 43 to terminal 42 of the double-pole-double-throw switch S-4.

Line 44 leads from line 43 to terminals 45; 46, and 47 of the set of three double-pole-single-throw switches, S-1; S-2, and S-3, respectively. Lines 48; 49, and 50 connect the positive terminals of the three banks of storage batteries 8; 9, and 10, with terminals 51; 52, and 53, of the three double-pole-single-throw switches, S-1; S-2, and S-3, respectively.

Terminal 54 of double-pole-double-throw switch S-4 is connected by line 55 to terminals 56; 57, and 58, of the three double-pole-single-throw switches S-1; S-2, and S-3, respectively. The equipment ground 4 is connected through shore connection 5 and reverse boat receptacle 6 by line 59 to the ground plate 7.

Finally, and most importantly, the circuit is completed by line 60 connecting the ships bonding ground 12 with the ground plate 7.

The flexible switching arrangement described herein enables the operator to test the condition of each individual bank of storage batteries, or all batteries collectively, and this is likewise true of the on-board alternators, which are not shown in the drawing. Each bank of batteries may be charged individually or all batteries may be charged simultaneously, if desired. The preferred circuit herein described is obviously applicable to boats using either 6; 12; 24, or 32 volt direct current installations. Additional protective devices, such as thermal overload switches, fuses and the like, may be incorporated in the circuit, as desired.

It will be obvious to those skilled in the art that various modifications may be made in the conventional portion of the described circuit within the scope of the present invention without departing from the spirit thereof, it being essential, however, that the neutral leg of the shore-based alternating current supply be electrically connected with both the ground plate and the ship's bonding ground.

I therefore particularly point out and distinctly claim as my invention:

1. In a system protecting the immersed metallic fittings of non-metallic hulls of docked power boats supplied by electrical power from a shorebased source of 3-wire customary voltage alternating current having a hot leg, a neutral leg, and an equipment ground;
   at least one storage battery for supplying current for on-board use;
   a marine battery charger and associated rectifier for maintaining the storage battery in operating condition;
   a ground plate;
   a ship's bonding ground, and
   an electrical circuit in which the negative leads of the battery charger and associated rectifier, the storage battery, the equipment ground, and the neutral leg of the shore-based alternating current supply, are electrically connected with both the ground plate and the ship's bonding ground to avoid electrolysis.

2. The protective system of claim 1 in which the shore-based power source is 3-wire 110 volt alternating current.

3. The protective system of claim 1 in which a plurality of storage batteries are provided for supplying current for on-board use.

4. The protective system of claim 3 in which a series of switches are provided whereby the condition of the batteries may be tested individually and the batteries charged as may be necessary to maintain the same in operating condition.

* * * * *